Sept. 22, 1959   B. H. CISCEL   2,905,877
ON-OFF SERVOSYSTEM WITH PROPORTIONAL CONTROL FEATURES
Filed May 4, 1956
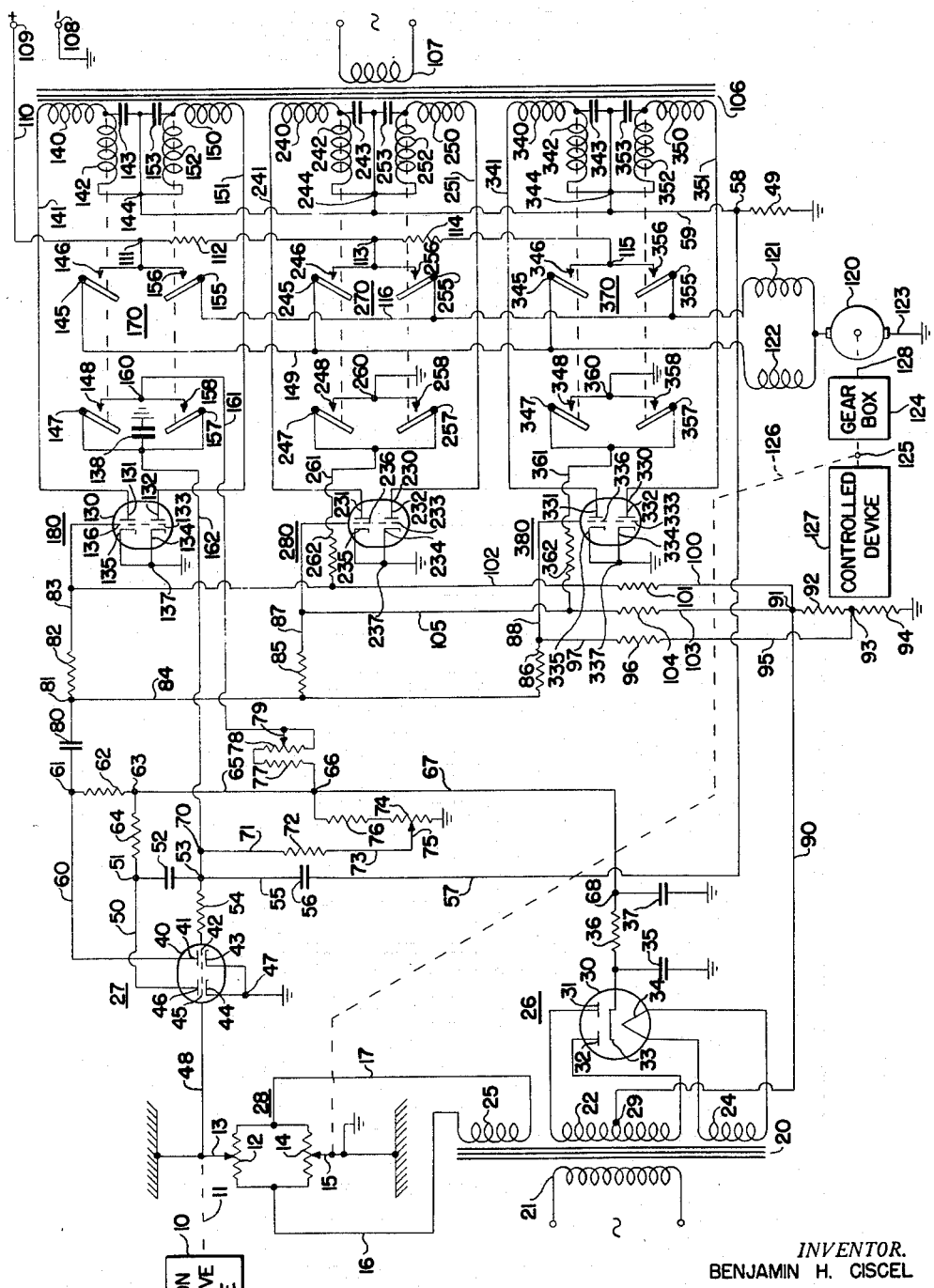
*INVENTOR.*
BENJAMIN H. CISCEL
BY Frederick E Lange
*ATTORNEY*

United States Patent Office 2,905,877
Patented Sept. 22, 1959

2,905,877

ON-OFF SERVOSYSTEM WITH PROPORTIONAL CONTROL FEATURES

Benjamin H. Ciscel, Medford Lakes, N.J., assignor to Minneapolis-Honeywell Regulator Company, Minneapolis, Minn., a corporation of Delaware Application May 4, 1956, Serial No. 582,841

14 Claims. (Cl. 318—479)

This invention relates to control apparatus, and particularly to control apparatus in which it is desirable to provide a variable energization of a controlled device in accordance with the signals produced by a means responsive to a controlling condition. An object of the present invention is to provide an improved control apparatus wherein the controlled device is variably energized in accordance with the magnitude of a variable condition.

Another object of my invention is to provide an improved means for variably energizing a controlled device in which the level of energization is controlled by the sequential operation of a set of relay means, the level of energization being dependent on the number of relay means effectively energized by a control signal.

Other objects and advantages of my invention will become apparent from a consideration of the appended specification, claims and drawings, in which:

The drawing is a schematic representation of control apparatus embodying the principles of my invention.

Referring now to the drawing, I have shown control apparatus for variably controlling the operation of a control device 127 in accordance with the output of a condition responsive device 10. Condition responsive device 10 is connected to bridge 28, the unbalance of which will supply a signal which is amplified by amplifier 27. The signal is then connected to amplifiers 180, 280 and 380 which control the energization of the relays 170, 270 and 370. The relays 170, 270 and 370 are adapted to be energized in accordance with the magnitude of the signal in a sequence of operations such that relay 370 is energized first, relay 270 is energized second and relay 170 is energized last. The relays have power contacts adapted to supply energization to motor 120 in steps increasing with the number of relays energized. The output of motor 120 is drivingly connected to gear box 124 the output of which is drivingly connected to controlled device 127 and to bridge 28 so as to rebalance the control apparatus. Power supply 26 is provided to supply D.C. energization for the amplifiers, and transformers 20 and 106 are provided to supply alternating current energization for the control apparatus.

Bridge 28 comprises potentiometer 12 having a wiper 13 and potentiometer 14 having a wiper 15. Bridge 28 is energized from secondary winding 25 on transformer 20 through leads 16 and 17. Wiper 15 on potentiometer 14 is connected to ground. Condition responsive device 10 is connected to wiper 13 of potentiometer 12 through driving means 11.

Power supply 26 includes a full wave rectifying device 30 having a pair of anodes 31 and 32 connected to the extremities of center tapped transformer winding 22 on transformer 20, a cathode 33 connected to positive lead 67 through resistor 36 and terminal 68, a cathode heater 34 connected to secondary winding 24 on transformer 20 and a pair of filter capacitors 35 and 37 connected between the extremities of resistor 36 and ground. Transformer 20 has a primary winding 21 which may be connected to a suitable source of alternating current. Center tap 29 on secondary winding 22 is connected to ground through negative lead 90, terminal 91, resistor 92, terminal 93 and resistor 94.

Amplifier 27 comprises a current controlling device 40 having a pair of anode electrodes 41 and 46, a pair of grid electrodes 42 and 45 and a pair of cathode electrodes 43 and 44. Cathode electrodes 43 and 44 are connected together at terminal 47 and thence to ground. Anode electrode 46 is energized from power supply 26 through positive lead 67, terminal 66, lead 65, terminal 63, resistor 64, terminal 51, and lead 50. Anode electrode 41 is energized from power supply 26 through positive lead 67, terminal 66, lead 65, terminal 63, resistor 62, terminal 61 and lead 60. Grid electrode 45 is connected to potentiometer wiper 13 through lead 48. Anode electrode 46 is connected to grid electrode 42 through lead 50, terminal 51, capacitor 52, terminal 53 and resistor 54. A positive potential is also supplied to grid electrode 42 from wiper 75 on voltage dividing potentiometer 74 through lead 73, resistor 72, lead 71, terminal 70, terminal 53 and resistor 54. Voltage dividing potentiometer 74 is connected to terminal 66 on positive lead 67 through resistor 76.

Amplifiers 180, 280 and 380 are similar in nature and where possible corresponding numerals have been used. Amplifier 180 comprises a current controlling device 130 having anode electrodes 131 and 132, grid electrodes 133 and 136 (shown internally connected) and cathode electrodes 134 and 135 connected together at terminal 137 and thence to ground. Amplifier 280 comprises current controlling device 230 having anode electrodes 231 and 232, grid electrodes 233 and 236 and cathode electrodes 234 and 235 connected together at terminal 237 and thence to ground. Amplifier 380 comprises current controlling device 330 having anode electrodes 331 and 332, grid electrodes 333 and 336, and cathode electrodes 334 and 335 connected together at terminal 337 and thence to ground.

Transformer 106 having a primary winding 107 adapted to be connected to a suitable source of alternating current, and having secondary windings 140, 150, 240, 250, 340, and 350, is provided to energize amplifiers 180, 280 and 380.

Anode electrodes 131 and 132 are connected so as to provide a discriminating action and are energized from transformer secondary windings 140 and 150 in a circuit including anode 131, lead 141, transformer secondary winding 140, relay winding 142, terminal 144, relay winding 152, transformer secondary winding 150, and lead 151 connected to anode 132. Terminal 144 is connected to ground through lead 59, terminal 58 and resistor 49. Capacitors 143 and 153 are connected across relay windings 142 and 152 respectively. Relay winding 142 is adapted to actuate contacts 145 and 146 and contacts 147 and 148. Relay winding 152 is adapted to actuate contacts 155 and 156 and contacts 157 and 158.

Anode electrodes 231 and 232 on current controlling device 230 are energized in a similar manner to anodes 131 and 132 on current controlling device 130. The circuit includes anode 232, lead 251, transformer secondary winding 250, relay winding 252, terminal 244, relay winding 242, transformer secondary winding 240, and lead 241 connected to anode 231. Capacitors 243 and 253 are connected across relay windings 242 and 252 respectively. Relay winding 242 has contacts 245 and 246 and contacts 247 and 248 associated therewith. Relay winding 252 has contacts 225 and 256 and contacts 257 and 258 associated therewith. Terminal 244 is connected to ground through lead 59, terminal 58 and resistor 49.

Anode electrodes 331 and 332 on current controlling device 330 are energized similarly to the above amplifiers. Anode 332 is connected to lead 351, transformer secondary winding 350, relay winding 352, terminal 344, relay winding 342, transformer secondary winding 340, and lead 341 connected to anode 331. Capacitors 343 and 353 are connected in parallel with relay windings 342 and 352 respectively. Relay winding 342 has contacts 345 and 346 and contacts 347 and 348 associated therewith. Relay winding 352 has contacts 355 and 356 and contacts 357 and 358 associated therewith. Terminal 344 is connected to ground through lead 59, terminal 58 and resistor 49.

Amplifiers 180, 280 and 380 are of the type well known in the art as discriminator amplifiers and have the characteristics of providing energization of one or the other of a pair of relay or motor windings in response to an input signal of one sense or another. Reference is made to the Albert P. Upton Patent, 2,423,534, July 8, 1947, and assigned to the assignee of this application, for a discussion of this type of amplifier.

The output of amplifier 27 appearing at anode 41 is connected in parallel with the grid electrodes of current controlling devices 130, 230 and 330 in amplifiers 180, 280 and 380 respectively. Anode 41 is connected to grids 136, 236 and 336 through lead 60, terminal 61, capacitor 80, terminal 81, through resistor 82 and lead 83, lead 84, resistor 85 and lead 87, and lead 84, resistor 86 and lead 88 respectively. A negative bias appearing across resistor 94 is connected to grid 336 of current controlling device 330 through terminal 93, lead 95, resistor 96, lead 97, and lead 88. A negative bias is supplied to grid 236 of current controlling device 230 from terminal 91 on negative lead 90 through lead 103, resistor 104, lead 105 and lead 87. A negative bias is also supplied to grid 136 of current controlling device 130 from terminal 91 through lead 100, resistor 101, lead 102 and lead 83.

Power terminals 108 and 109 are adapted to be connected to a suitable source of direct current. Positive terminal 109 is connected to stationary relay contacts on relay 170, 146 and 156 through lead 110 and terminal 111. Stationary contacts 246 and 256 on relay 270 are energized from positive terminal 109 through lead 110, terminal 111, resistor 112, and terminal 113. Stationary contacts 346 and 356 on relay 370 are energized from positive terminal 109 through lead 110, terminal 111, resistor 112, terminal 113, resistor 114 and terminal 115. Movable relay contacts 145, 245 and 345 are connected to field winding 122 on motor 120 through lead 149. Movable contacts 155, 225 and 355 are connected to field winding 121 on motor 120 through lead 116. Field windings 121 and 122 on motor 120 are connected to ground through the armature of motor 120 and lead 123.

The output of motor 120 is connected to gear box 124 through driving means 128. The output of gear box 124 is connected to control device 127 through driving means 125 and also to wiper 15 on rebalance potentiometer 14 through driving means 126.

Stationary relay contacts 348 and 358 on relay 370 are connected to ground through terminal 360. Stationary contacts 248 and 258 on relay 270 are connected to ground through terminal 260. Stationary contacts 148 and 158 on relay 170 are connected to positive lead 67 through terminal 66, resistor 77, rheostat 78 having a wiper 79, lead 161 and terminal 160.

Movable contacts 347 and 357 on relay 370 are connected to grid 236 on current controlling device 230 through lead 361, resistor 362, lead 105 and lead 87. Movable contacts 247 and 257 on relay 270 are connected to grid 136 on current controlling device 130 through lead 261, resistor 262, lead 102 and lead 83. Movable contacts 147 and 157 on relay 170 are connected to grid 42 on current controlling device 40 through lead 162, terminal 70, terminal 53 and resistor 54. A capacitor 138 is connected between movable contacts 147 and 157 and ground.

*Operation*

When bridge 28 is in the attitude shown, there is no signal impressed on grid 45 of current controlling device 40. Under this condition all of the relays are de-energized and motor 120 is inoperative.

Before going into an explanation of operation of this apparatus it may be desirable to note that the negative bias applied to the control grids of amplifiers 180, 280 and 380 is such that with no signal from amplifier 27, the negative bias applied to amplifier 380 will be of such magnitude as to allow conduction, and thereby energization of one or the other of relays 342 and 352, on reception of a signal from amplifier 27. In this initial condition the negative bias applied to amplifiers 180 and 280 is of such magnitude as to prevent conduction on reception of a signal from amplifier 27.

Now, assuming a change in the condition of the controlled device is sensed by condition responsive device 10, an alternating signal of phase and magnitude dependent upon the direction and amount of displacement of potentiometer wiper 13, is applied to control electrode 45 in current controlling device 40. This signal is amplified and in turn applied to control electrode 42 of current controlling device 40. The output from anode 41 of current controlling device 40 is then applied to parallel connected amplifier 180, 280 and 380. Since amplifiers 180 and 280 are biased nonconductive to a greater degree than amplifier 380, only amplifier 380 will conduct and relay winding 342 or 352 will be energized dependent upon the phase of the signal from bridge 28. Assuming relay winding 342 is energized, relay contacts 345 and 346 will be closed to energize winding 122 of motor 120 through a circuit from positive terminal 109 through lead 110, terminal 111, resistor 112, terminal 113, resistor 114, terminal 115, stationary relay contact 346, movable relay contact 345, lead 149, motor field winding 122, motor 120 and lead 123 to ground. At the same time stationary relay contact 348 and movable relay contact 347 will be closed to effectively place resistor 362 in parallel with resistors 92 and 94 thereby reducing the amount of negative bias applied to the control electrodes 238 and 236 of amplifier 280 to a magnitude which will allow amplifier 280 to become conductive when the signal from amplifier 27 reaches a predetermined magnitude. Motor 120 will rotate under reduced energization, due to the series resistors 112 and 114, to actuate the controlled device 127 and wiper 15 on follow-up potentiometer 14.

Assuming that the signal from bridge 28 is large enough to overcome the bias supplied to amplifier 280, amplifier 280 will become conductive, and as the signal has not reversed phase, relay winding 242 will be energized to close its associated contacts. Now motor 120 will be energized from positive terminal 109 through lead 110, terminal 111, resistor 112, terminal 113, stationary contact 246, movable contact 245, lead 149, motor field winding 122, motor 120 and lead 123 connected to ground. This effectively removes resistor 114, and motor 120 is energized to a higher value so as to rotate at a greater speed. The closure of relay contacts 247 and 248 again serves to place a resistor 262, in parallel with resistors 92 and 94 to decrease the amount of negative bias supplied to the control electrodes 133 and 136 of amplifier 180. The value of this bias is slightly higher than that impressed on the control electrodes of amplifier 280 so that a slightly higher magnitude of signal will be required before amplifier 180 will conduct.

Assuming the magnitude of the signal is high enough to cause conduction of amplifier 180, and the phase remains the same, relay winding 142 will be energized and will close relay contacts 145 and 146 and 147 and 148. Upon closure of contacts 145 and 146 motor 120 is connected directly to positive terminal 109 and will be operative at its maximum speed. At the same time, the closing of relay contacts 147 and 148 completes a circuit from terminal 66 on positive supply lead 67 to grid 42 on amplifier 27. The circuit includes positive terminal 66, resistor 77, resistor 78 having a wiper 79, lead 161, terminal 160, relay contacts 148 and 147, lead 162, terminal 70, terminal 53 and resistor 54 connected to grid 42 on current controlling device 40.

The capacitor 138, connected between relay contact 147 and ground, serves to provide a small time delay in the application of the positive potential to grid 42. After this time interval, the positive potential serves to saturate amplifier 27 so that no signal will be applied to amplifiers 180, 280 and 380. With no signal applied to amplifiers 180, 280 and 380, all of the relays will be de-energized and motor 120 will be disconnected from positive terminal 109. With all of the relays de-energized, grid 42 will no longer be connected to positive terminal 66 and, after an interval of time long enough for capacitor 138 to discharge, amplifier 27 will no longer be saturated and the signal will be applied to parallel connected amplifiers 180, 280 and 380.

For a full discussion of the operation of the throttling circuits above described, reference is made to the Willis H. Gille Patent, 2,425,733, August 19, 1947, assigned to the assignee of this application.

The previously described throttling action does not occur for all magnitudes of signal since the magnitude of signal required to energize the relays associated with amplifiers 180, 280 and 380 varies, it will be seen that for a signal of magnitude less than that required to start conduction of amplifier 180, only relays 370 and 270 will be energized in that order. If the signal is of a magnitude less than that necessary to overcome the bias on amplifier 280, only relay 370 will be energized. It is understood of course that the sequence of operation of the relays is always in the same order in this embodiment. This is due to the contacts which control the bias on the next succeeding amplifiers.

The connection from terminal 58 through lead 57, capacitor 56, lead 55, terminal 53 and resistor 54 to control electrode 41 is provided for a feedback of the voltage appearing across resistor 49 so as to improve the hunting characteristics of the system.

It is further seen that in the control apparatus I have shown, a very smooth operation of motor 120 is obtained through a variable energization provided first by the sequentially increased application of power and second by the throttling action of the control circuit. Further it is seen that as the control apparatus approaches the balance point, the speed of the motor 120 is reduced so as to tend to prevent overshoot or hunting of the system. While I have shown and described a preferred embodiment of my invention, other modifications will occur to those skilled in the art, and therefore I wish my invention to be limited only by the appended claims.

I claim:

1. In control apparatus, means for variably controlling the energization of a controlled device in accordance with a source of an electric signal of variable magnitude and reversible sense, comprising: a plurality of amplifier means connected to said source of signal and operable sequentially and cumulatively dependent on the magnitude of said electric signal; and relay means connected to each of said amplifier means and said controlled device, said relay means being adapted to variably control the energization of said controlled device.

2. Control apparatus comprising: a source of an electric signal of variable magnitude, motor means to be variable energized in accordance with the magnitude of said signal; a plurality of relays, means controlled by said relays for variably energizing said motor dependent upon the number of said relays which are effectively energized and amplifier means connected to said source of signal of variable magnitude and to said relay means and operative sequentially and cumulatively to effectively energize said relays, the number of said relays being effectively energized being dependent upon the magnitude of said electric signal.

3. In control apparatus, means for providing variable energization of a motor means in accordance with the sense and magnitude of a source of an electric signal comprising: a plurality of amplifier-relay means adapted to be sequentially and cumulatively energized dependent on the magnitude of said electric signal so as to supply a variable energization to said motor means; and means connecting said amplifier-relay means in parallel relationship between said source of an electric signal and said motor means.

4. Control apparatus comprising: a source of an electric signal of variable sense and magnitude; reversible motor means to be variably energized in accordance with the magnitude of said electric signal; a plurality of relays connected so as to supply a variable energization to said motor means dependent on the number of relays which are effectively energized; means for controlling the energization of said relay means comprising a plurality of amplifier means corresponding in number to said relay means, and adapted to be operative sequentially and cumulatively dependent on the magnitude of said electric signal, and having input and output terminals; means connecting said input terminals in parallel with said source of an electric signal; means connecting the output terminals of each amplifier means to corresponding relay means.

5. Control apparatus comprising: a source of an electric signal of variable magnitude and reversible sense; a reversible motor operative in one direction or the other at a speed dependent upon the magnitude of said electric signal and in a direction dependent upon the sense of said electric signal; a plurality of sets of relays for controlling the direction and speed of operation of said motor, one set of relays designed to be connected so as to cause operation of said motor in one direction at a speed dependent upon the number of said relays which are effectively energized and a second set of relays designed to control operation of said motor in the opposite direction at a speed dependent upon the number of said relays which are effectively energized; and amplifier means connected to said source of signal and to said sets of relays and operative upon said signal being of one sense to cause progressive effective energization of said relays dependent upon the magnitude of said signal and when said signal is of the opposite sense to cause progressive effective energization of the other of said sets of relays.

6. Control apparatus comprising: a source of an electric signal of variable magnitude and reversible sense; a device to be controlled in response to said electric signal; a plurality of amplifier-relay means connected in parallel relationship with said source of an electric signal; means associated with said relays for causing said amplifier-relay means to be sequentially and cumulatively energizable dependent on the magnitude of said signals; and means connecting said amplifier-relay means in energizing relationship with said controlled device.

7. Control apparatus comprising: a source of an electric signal of variable magnitude; a device to be controlled in accordance with said electric signal; a plurality of relays for controlling the magnitude and rate of energization of said controlled device dependent upon the number of relays effectively energized; and amplifier means connected to said source of signal and said relays and operable to cause progressive and cumulative energization of a number of said relays dependent on the magnitude of said electric signal.

8. In control apparatus, means for variably energizing a motor means at a predetermined rate and to a magnitude dependent on the magnitude of an electric signal comprising: a plurality of relays for variably controlling the energization of said motor means dependent on the number of said relays which are effectively energized; and amplifier means connected to said relays and operative in response to said signal so as to cause sequential and cumulative energization of a number of said relays dependent on the magnitude of said electric signal and at a predetermined rate.

9. In control apparatus, means for variably controlling the energization of a controlled device in accordance with an electric signal of variable magnitude, comprising: a plurality of amplifier-relay means for variably controlling the energization of said controlled device including means associated with said relay means for providing sequential and cumulative operation of said amplifier-relay means in a predetermined manner.

10. Control apparatus comprising: a source of an electric signal of variable magnitude; motor means to be variable energized in accordance with the magnitude of said electric signal; a plurality of relay means; amplifier means connected to said source of electric signal and to said relay means; means associated with said relay means for providing sequential and cumulative energization of said relay means in a predetermined order, the number of relay means energized being dependent on the magnitude of said electric signal; and circuit means connecting said relay means to said motor means.

11. In control apparatus, means for variably energizing a motor means in accordance with the magnitude of a source of an electric signal comprising: first, second and third amplifier means; first, second and third relay means connected to respective amplifier means, said relay means including means associated with said first and second relay means for allowing sequential and cumulative energization of said relay means to an extent dependent on the magnitude of said electric signal and means associated with said third relay means for providing de-energization of all of said relay means on energization of said third relay means; means connecting said source of an electric signal to said amplifier means; and circuit means connecting said relay means to said motor means.

12. Control apparatus comprising: a source of an electric signal of variable magnitude; a device to be variably energized in accordance with the magnitude of said electric signal; and a plurality of amplifier-relay means connected to said source of an electric signal and said device to be variably energized, said amplifier-relay means including means for providing sequential and cumulative energization of said amplifier-relay means in a predetermined order and to an extent dependent on the magnitude of said electric signal, and further means, associated with one of said amplifier-relay means, for effectively de-energizing all of said amplifier-relay means after sequential energization, when said electric signal is of a predetermined magnitude.

13. Control apparatus comprising: a source of an electric signal of variable magnitude; a device to be variably energized in accordance with the magnitude of said electric signal; and a plurality of amplifier-relay means connected to said source of an electric signal and said device to be variably energized, said amplifier-relay means including means for providing sequential and cumulative energization of said amplifier-relay means in a predetermined order and to an extent dependent on the magnitude of said electric signal, and further means including delay means, associated with one of said amplifier-relay means, for effectively de-energizing all of said amplifier-relay means a predetermined time after sequential energization, when said electric signal is of a predetermined magnitude.

14. In control apparatus, means for variably energizing a motor means in accordance with the magnitude of a source of an electric signal comprising: first, second and third amplifier means; first, second and third relay means connected to respective amplifier means, said relay means including means associated with said first and second relay means for allowing sequential and cumulative energization of said relay means to an extent dependent on the magnitude of said electric signal and means including delay means associated with said third relay means for providing de-energization of all of said relay means a predetermined time after energization of said third relay means; means connecting said source of an electric signal to said amplifier means; and circuit means connecting said relay means to said motor means.

References Cited in the file of this patent

UNITED STATES PATENTS 2,560,337     Fouassin _____ July 10, 1951